US009199388B2

(12) United States Patent
Cummins et al.

(10) Patent No.: US 9,199,388 B2

(45) Date of Patent: Dec. 1, 2015

(54) SYSTEM FOR FINISHING PRINTED LABELS USING MULTIPLE X-Y CUTTERS

(71) Applicant: Primera Technology, Inc., Plymouth, MN (US)

(72) Inventors: Robert P. Cummins, Deephaven, MN (US); Todd A. Britz, Maple Grove, MN (US); Darren W. Haas, Minnetonka, MN (US); Michael R. Tolrud, Chaska, MN (US)

(73) Assignee: Primera Technology, Inc., Plymouth, MN (US)

( * ) Notice: Subject to any disclaimer, the term of this patent is extended or adjusted under 35 U.S.C. 154(b) by 21 days.

(21) Appl. No.: 14/157,258

(22) Filed: Jan. 16, 2014

(65) Prior Publication Data

US 2014/0130325 A1 May 15, 2014

Related U.S. Application Data

(62) Division of application No. 12/701,732, filed on Feb. 8, 2010, now Pat. No. 8,663,410.

(60) Provisional application No. 61/242,054, filed on Sep. 14, 2009.

(51) Int. Cl.
*B32B 41/00* (2006.01)
*B26D 7/26* (2006.01)
(Continued)

(52) U.S. Cl.
CPC .............. *B26D 7/2614* (2013.01); *B26D 3/085* (2013.01); *B26F 1/3806* (2013.01); *B31D 1/026* (2013.01);
(Continued)

(58) Field of Classification Search
CPC ........ B31D 1/021; B31D 1/026; B26D 11/00; B26D 5/02; B65H 2220/01; B65H 23/1882; B26F 1/3853; B65C 9/1803
USPC ......... 156/354, 360, 361, 510, 522, 250, 252, 156/254, 258, 259, 265, 268, 269, 270, 156/271; 83/39, 286, 408, 508.3, 940
See application file for complete search history.

(56) References Cited

U.S. PATENT DOCUMENTS 2,877,846 A 3/1959 Tobey
3,496,817 A 2/1970 Staats et al.
(Continued)

FOREIGN PATENT DOCUMENTS

CN 2446064 Y 9/2001
EP 1110684 6/2001
(Continued)

OTHER PUBLICATIONS

Notification of the International Search Report for Appln. No. PCT/US2010/048596, filed Sep. 13, 2010.
(Continued)

*Primary Examiner* — Michael N Orlando
*Assistant Examiner* — Joshel Rivera
(74) *Attorney, Agent, or Firm* — Westman, Champlin & Koehler, P.A.; Z. Peter Sawicki

(57) ABSTRACT

A label finishing station receives a web carrying printed images for labels arranged so there are a plurality of images formed in rows or ranks across the width of the web. The images are also arranged in longitudinal columns along the length of the web. A cutting station carries a plurality of cutter heads to cut out the plurality of labels forming each row or rank simultaneously. The web, with the label peripheries cut out, may be slit longitudinally and formed into finished rolls of labels.

5 Claims, 16 Drawing Sheets

(51) Int. Cl.

| | |
|---|---|
| ***B26D 3/08*** | (2006.01) |
| ***B26F 1/38*** | (2006.01) |
| ***B31D 1/02*** | (2006.01) |
| *B26D 5/32* | (2006.01) |
| *B26D 11/00* | (2006.01) |

(52) U.S. Cl.

CPC . *B26D 5/32* (2013.01); *B26D 11/00* (2013.01); *Y10T 29/4978* (2015.01); *Y10T 156/1057* (2015.01); *Y10T 156/1322* (2015.01); *Y10T 156/1712* (2015.01); *Y10T 156/1741* (2015.01)

(56) References Cited

U.S. PATENT DOCUMENTS

| | | | | |
|---|---|---|---|---|
| 4,070,890 | A | 1/1978 | Stubbings | |
| 4,266,112 | A | 5/1981 | Niedermeyer | |
| RE30,645 | E | 6/1981 | Stubbings | |
| 4,459,885 | A | 7/1984 | Friberg | |
| 4,568,403 | A | 2/1986 | Egan | |
| 4,592,259 | A | 6/1986 | Gorner et al. | |
| 4,614,952 | A | 9/1986 | Nara et al. | |
| 4,649,782 | A | 3/1987 | Cavagna | |
| 4,662,258 | A | 5/1987 | Mood | |
| 4,782,208 | A | 11/1988 | Withrow et al. | |
| 4,940,690 | A | 7/1990 | Skees | |
| 5,100,270 | A | 3/1992 | Dowdle et al. | |
| 5,107,257 | A | 4/1992 | Fukuda | |
| 5,269,211 | A | 12/1993 | Flaming | |
| 5,365,816 | A | 11/1994 | Rudy | |
| 5,436,646 | A | 7/1995 | Schilling et al. | |
| 5,487,807 | A | 1/1996 | Nedblake et al. | |
| 5,621,864 | A | 4/1997 | Benade et al. | |
| 5,642,835 | A | 7/1997 | Young et al. | |
| 5,775,193 | A | 7/1998 | Pratt | |
| 5,776,297 | A | 7/1998 | Edwards et al. | |
| 5,846,005 | A | 12/1998 | Britz et al. | |
| 5,907,984 | A | 6/1999 | Herman, Jr. et al. | |
| 6,098,512 | A | 8/2000 | Life et al. | |
| 6,125,729 | A | 10/2000 | Mirabello | |
| 6,174,402 | B1 | 1/2001 | Nakano et al. | |
| 6,201,256 | B1 | 3/2001 | Kouchi et al. | |
| 6,250,192 | B1 | 6/2001 | Akram et al. | |
| 6,401,782 | B1 * | 6/2002 | Beaudry | 156/352 |
| 6,471,802 | B1 | 10/2002 | Williamson | |
| 6,634,928 | B2 | 10/2003 | Erickson et al. | |
| 6,641,684 | B2 | 11/2003 | Instance | |
| 6,716,501 | B2 | 4/2004 | Kovalchuk et al. | |
| 6,802,663 | B2 | 10/2004 | Kwasny et al. | |
| 6,843,155 | B2 | 1/2005 | Slyne | |
| 6,872,277 | B2 | 3/2005 | Klein et al. | |
| 6,919,113 | B2 | 7/2005 | Therrian et al. | |
| 7,001,654 | B2 | 2/2006 | Kiraly et al. | |
| 7,011,005 | B2 * | 3/2006 | Koutonen et al. | 83/34 |
| 7,121,750 | B2 | 10/2006 | Iwase et al. | |
| 7,137,338 | B2 | 11/2006 | Brandenburg et al. | |
| 7,195,689 | B2 | 3/2007 | Adams et al. | |
| 7,241,357 | B2 | 7/2007 | Roth et al. | |
| 7,422,386 | B2 | 9/2008 | Ohmori et al. | |
| 7,434,908 | B2 | 10/2008 | Ohmori et al. | |
| 7,467,535 | B2 | 12/2008 | Kuno et al. | |
| 2001/0018857 | A1 | 9/2001 | Laroche | |
| 2001/0018945 | A1 | 9/2001 | Instance | |
| 2005/0000842 | A1 | 1/2005 | Timmerman et al. | |
| 2005/0167044 | A1 | 8/2005 | Exeter et al. | |
| 2006/0191426 | A1 | 8/2006 | Timmerman et al. | |
| 2006/0204700 | A1 | 9/2006 | Kiraly | |
| 2006/0219364 | A1 | 10/2006 | Yodokawa et al. | |
| 2008/0148981 | A1 | 6/2008 | Brandenburg et al. | |
| 2008/0289753 | A1 | 11/2008 | Bauer | |
| 2009/0107622 | A1 | 4/2009 | Combs et al. | |

FOREIGN PATENT DOCUMENTS

| | | |
|---|---|---|
| FR | 2763017 | 11/1998 |
| GB | 2152005 | 7/1985 |
| WO | 9711841 | 4/1997 |

OTHER PUBLICATIONS

Written Opinion of the International Search Report for Appln. No. PCT/US2010/048596, filed Sep. 13, 2010.

Sclater et al, Mechanisms and Mechanical Devices Sourcebook (4th Edition), "Chapter 2: Motion Control Systems" (pp. 22-48), McGraw-Hill, 2007.

First Official Action (for PCT appln. entering National Phase) in related Chinese application Serial No. 201080040869.9, filed Mar. 14, 2012, 16 pgs. With English translation.

Chinese Office Action; 201080040869.9, Aug. 19, 2013.

Allen Datagraph Systems, Inc. advertisement "Smart Mark" Published Jun. 17, 2009, admitted prior art. 1 pg. and Smart Mark Data Sheet, 1 pg.

* cited by examiner

SYSTEM FOR FINISHING PRINTED LABELS USING MULTIPLE X-Y CUTTERS

The present application is a divisional application of U.S. patent application Ser. No. 12/701,732, filed Feb. 8, 2010, which claims priority, under 35 U.S.C. §119(e), on U.S. Provisional Application No. 61/242,054 filed Sep. 14, 2009, the contents of which are hereby incorporated by reference in their entirety.

BACKGROUND OF THE DISCLOSURE

The present disclosure relates to a finishing system for labels when the label content has been printed onto a continuous web. The finishing system receives the printed web, and then simultaneously cuts around the perimeters of a plurality of labels oriented across a width of the web. A laminate film optionally can be applied over the printing. The web is slit into multiple narrower webs after a waste matrix is removed.

Currently, finishing stations for high speed production of labels comprise a rotary die that will cut out the individual labels as the die rotates. This has a requirement for providing fixed dies that must be built for each unique label, shape and size. Time and die costs are prohibitive for jobs of a small number of labels.

At the present time there are also single knife x-y plotters for label finishing machines, and while these machines require no dies, and can run a variety of label shapes under computer control without requiring additional set up times, they are very slow and one knife must trace the outline of every label.

SUMMARY OF THE DISCLOSURE

The present disclosure provides a finishing station that receives a web of label material having preprinted images or words thereon and then passes the web through a multiple knife x-y cutter system, so that a plurality of labels across the width of the web can be cut out around the printed images at once. A lamination process station is optionally included in the finishing station, and if a laminate film is laminated over the printed labels, the cutter cuts the outline or periphery of the label through the laminate film and the label stock, leaving a substrate or release layer carrying the labels uncut.

The waste laminate and label stock surrounding the labels after cutting is removed from the substrate, and then the substrate can be split longitudinally as the substrate and finished cut labels move through the finishing station to form individual strips of labels, which are wound onto suitable rolls for multiple finished rolls of labels.

The finishing station of the present disclosure is suitable for small and intermediate size runs of labels without having huge tooling costs, and has an increased speed over present systems for small or intermediate size runs because of the multiple cutters used for cutting the label stock into the individual shape or size of labels desired.

Controlling the movement of the web longitudinally or in the y-direction, and the lateral or x-direction movement of the cutters, and providing a suitable program tying these motions together permits one to cut labels of any desired shape and size. The longitudinal slitting of the supporting substrate so that there are individual strips of the labels can be optional, depending on whether or not the roll of finished labels can be used with an uncut web having two or more labels across the width.

DETAILED DESCRIPTION OF ILLUSTRATIVE EMBODIMENTS

Figure 1:
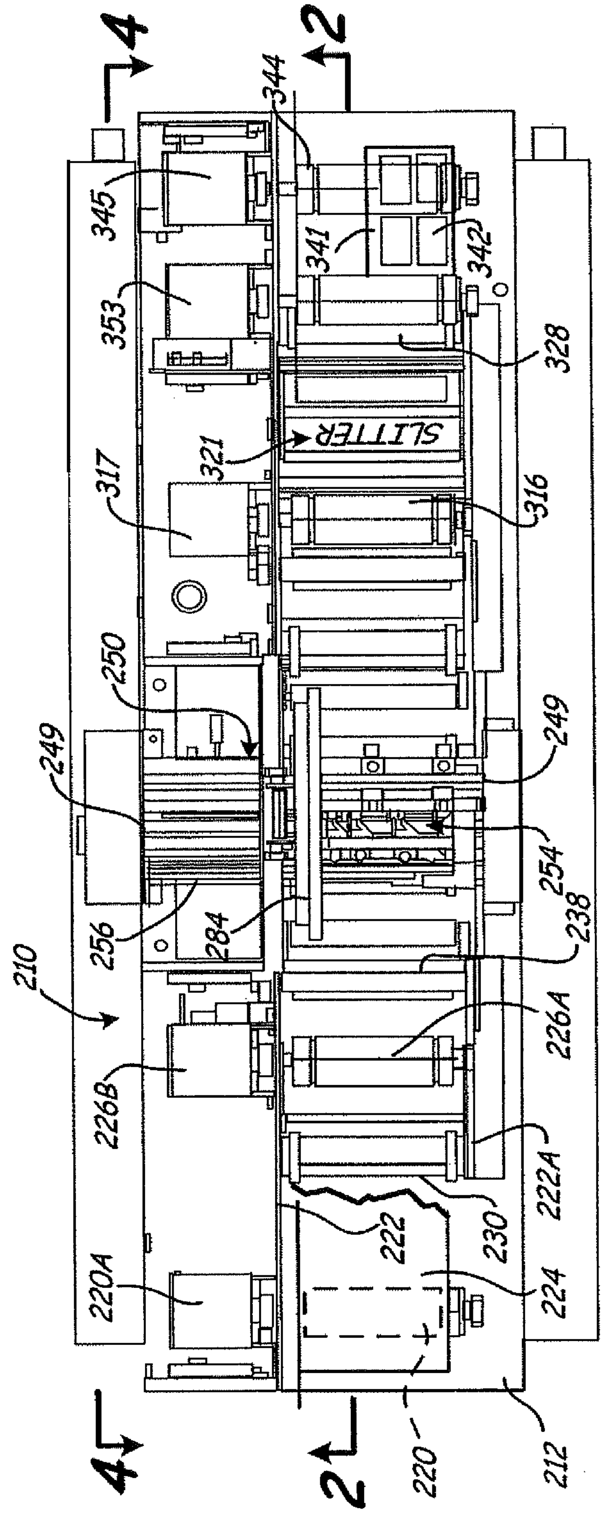
FIG. 1 is a top plan view of a finishing station or system made according to an embodiment of the present disclosure.

A label finishing station 210 of the present disclosure is shown in the FIGS., and includes a support frame 212 mounted on suitable legs 214 (FIG. 2) on a support floor 216. The finishing station 210 is set up to receive a continuous strip of pre-printed images on media web 224 from a supply roll 218 shown in FIGS. 1 and 2. The media web 224 has an adhesive backed layer of a label stock supported on a release layer or substrate, as is well known. The top surface of the media web 224 has individually printed images or blocks of information as will be shown in FIG. 10 that will be separated out as labels. The supply roll 218 is mounted on a mandrel 220 of conventional design, and is rotatably mounted on a side plate 222, with a mandrel support frame 220A. Roll 218 is driven by a motor 219.

Alternately, an output of a continuous strip of media web directly from a printer such as a digital label printer made by Primera Technology, Inc. of Plymouth, Minn., can be used so that the label printer directly supplies a media web such as the media web 224 with the blocks of printing in place, rather than providing a supply roll 218.

Other types of printed label sources also can be used as desired. The number of rows or lateral ranks of labels also can be selected as desired, with four being shown.

A laminating film supply roll 226 is used to provide a web of laminating film 228. Generally the laminating film is clear and overlies the media web 224 and thus overlies the printing on the media web 224 that will form labels. The laminating film is laminated onto the media web and over the printed material for protecting the printing for the printed labels in a process that is well known in the art for cold laminating webs or sheets onto labels or other stock. The laminating film supply is wound on a roll on a mandrel 226A that is rotatably supported on side plate 222 on a mandrel support frame 226B, and which is driven by a motor 225.

The media web 224 is fed over idler rollers 230, 232, and 234 (FIG. 2), which idler rollers are rotatably mounted on side plate 222, and with distal ends supported on plate 222A (See FIG. 1). The laminating film web 228 is passed around an idler roller 236 (also supported on plates 222 and 222A), and then is moved so it overlies the media web 224 and approaches a laminating station at a shallow angle relative to the media web. The laminating station 238 comprises a pair of rolls shown generally at 239, at least one of which is driven by a motor 240. The laminating rolls 239 press and laminate the film web 228 and the media web 224 together, as is well known.

Figure 17:
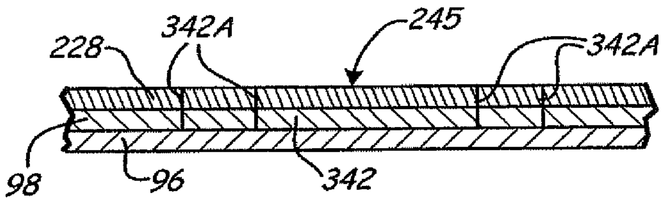
FIG. 17 is an enlarged sectional view of a typical label strip, having a substrate layer, a label layer thereon, and illustrating a laminated film over the label layer, and showing cuts for individual labels through a laminate layer and label layer, but not through the release or substrate layer.

The combined laminate film 228 and print carrying media web 224 form a laminated label web 245 when it exits the laminating station 238, and thus the laminated label web comprises three layers, as shown in FIG. 17. The three layer label web includes the laminating film 228, as shown in FIG. 17, a label stock layer 98 and a release layer or substrate 96, which together form the laminated label web 245.

Figure 2:
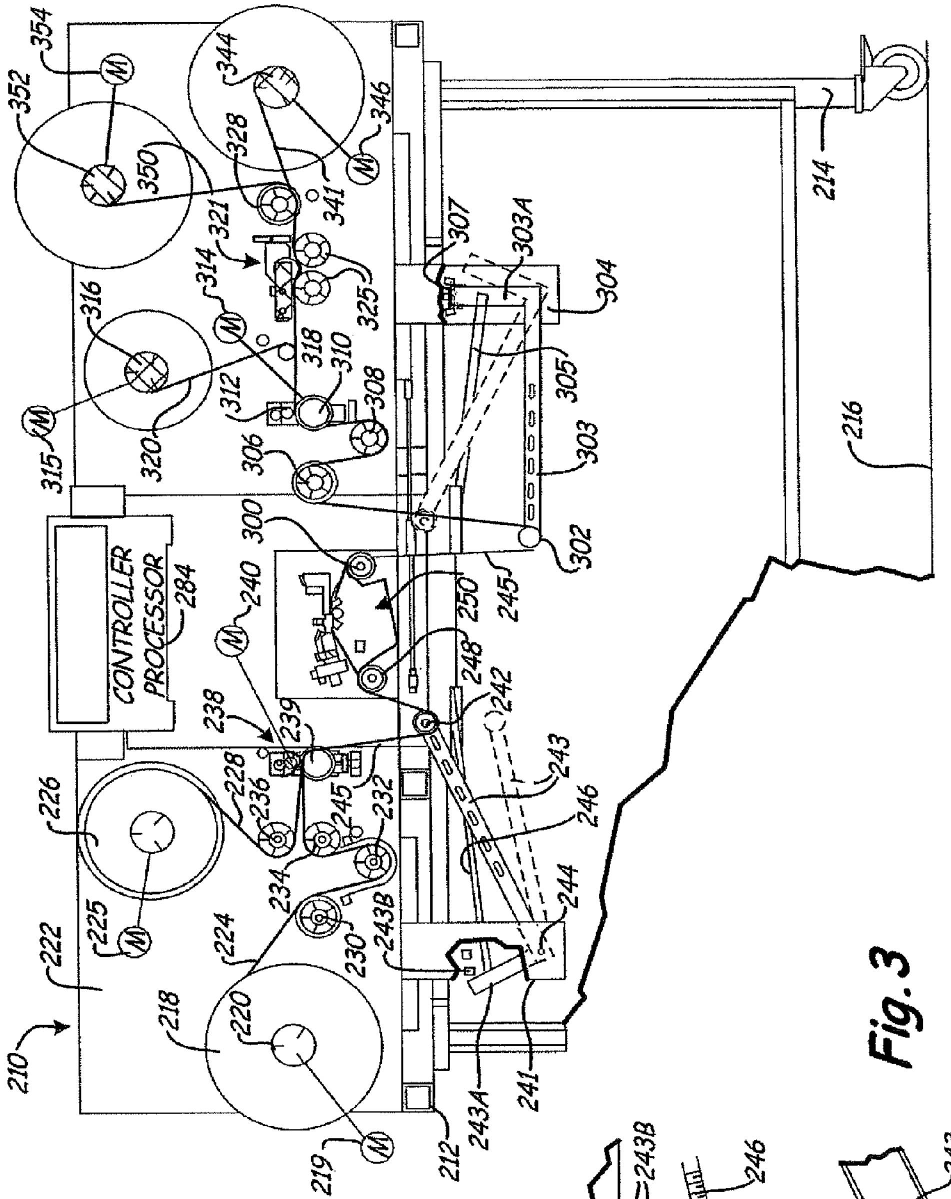
FIG. 2 is a sectional view taken along line 2-2 in FIG. 1.
Figure 3:
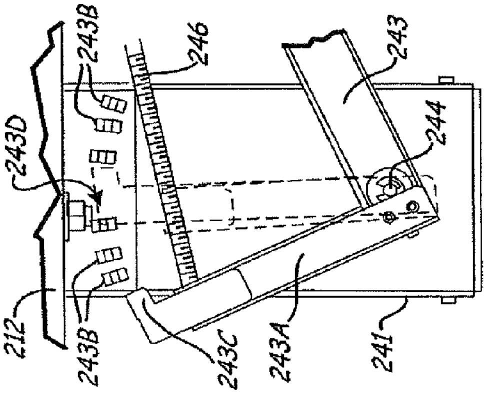
FIG. 3 is an enlarged view of a mounting and sensor arrangement for a slack take up roller shown in FIG. 2.
Figure 4:
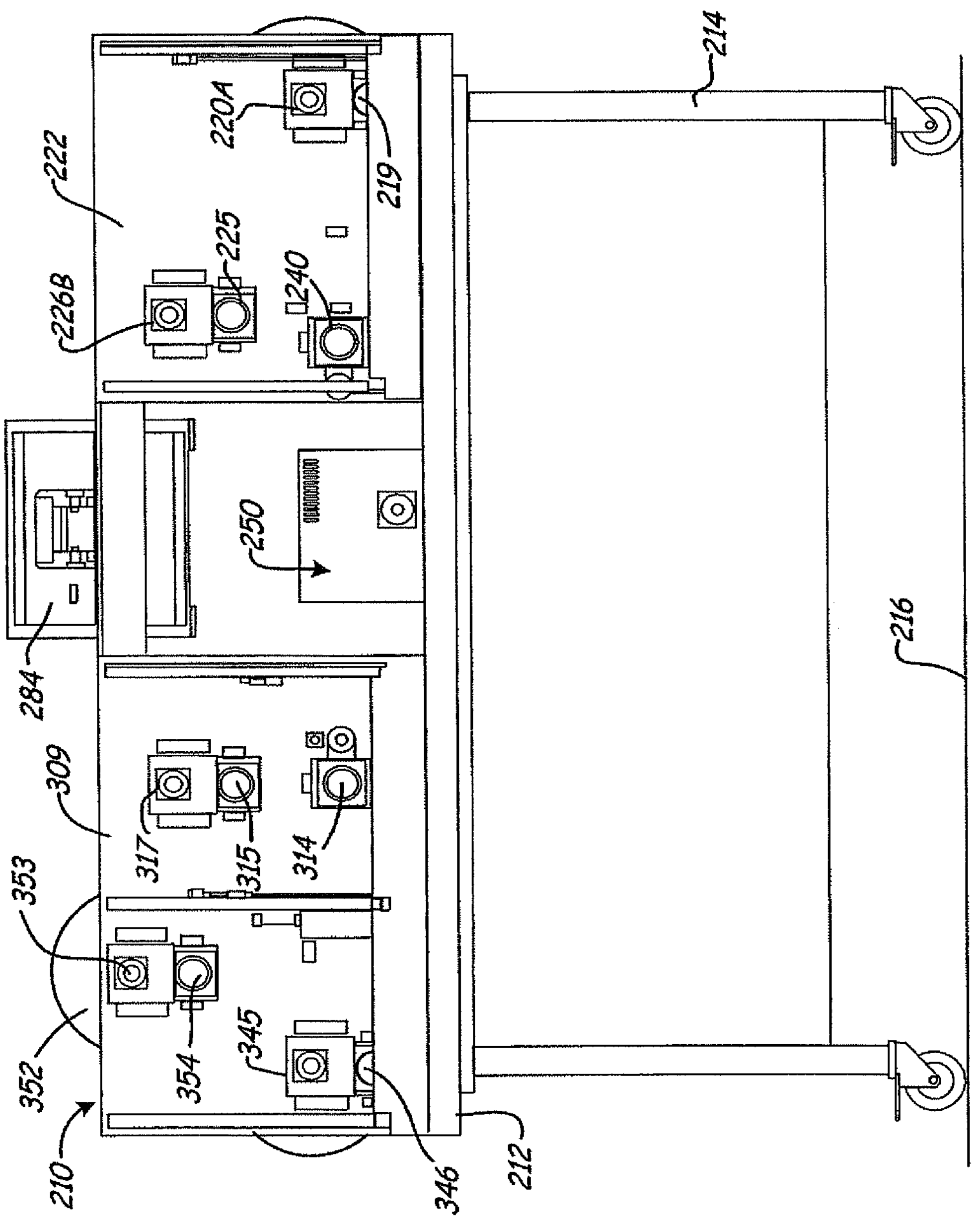
FIG. 4 is a side elevational view taken along line 4-4 in FIG. 1.

The laminated label web 245 is then passed around a dancer roller or web slack take up roller indicated at 242, which is mounted onto pivoting arms 243 (one on each side of the frame), (FIGS. 2 and 3) which are pivotally mounted at a pivot 244 on a frame 241 which in turn is mounted on the frame 212. A spring 246 is used for spring loading the arms 243 so the dancer roller 242 will be used to move downwardly, as shown. The spring 246 is selected in strength so as to take up and maintain slack in the laminated label web 245. Each arm 243 has a lever portion 243A to which the spring 246 attaches. As shown in FIG. 3, lever 243A carries one portion 243C of a sensor assembly 243D that will move past sensor indicia 243B to indicate the pivotal position of the arm 243, which in turn will indicate the slack in the web 245 on the input side of a label cutter station 250. The laminated label web 245 is then passed over a further idler roller 248 on the input side of the label cutter station 250 which is supported on the frame 212. The cutter station 250 includes a multiple cutter head carriage that is movably mounted and driven to move the cutter heads for cutting the peripheries of printed labels.

Figure 5:
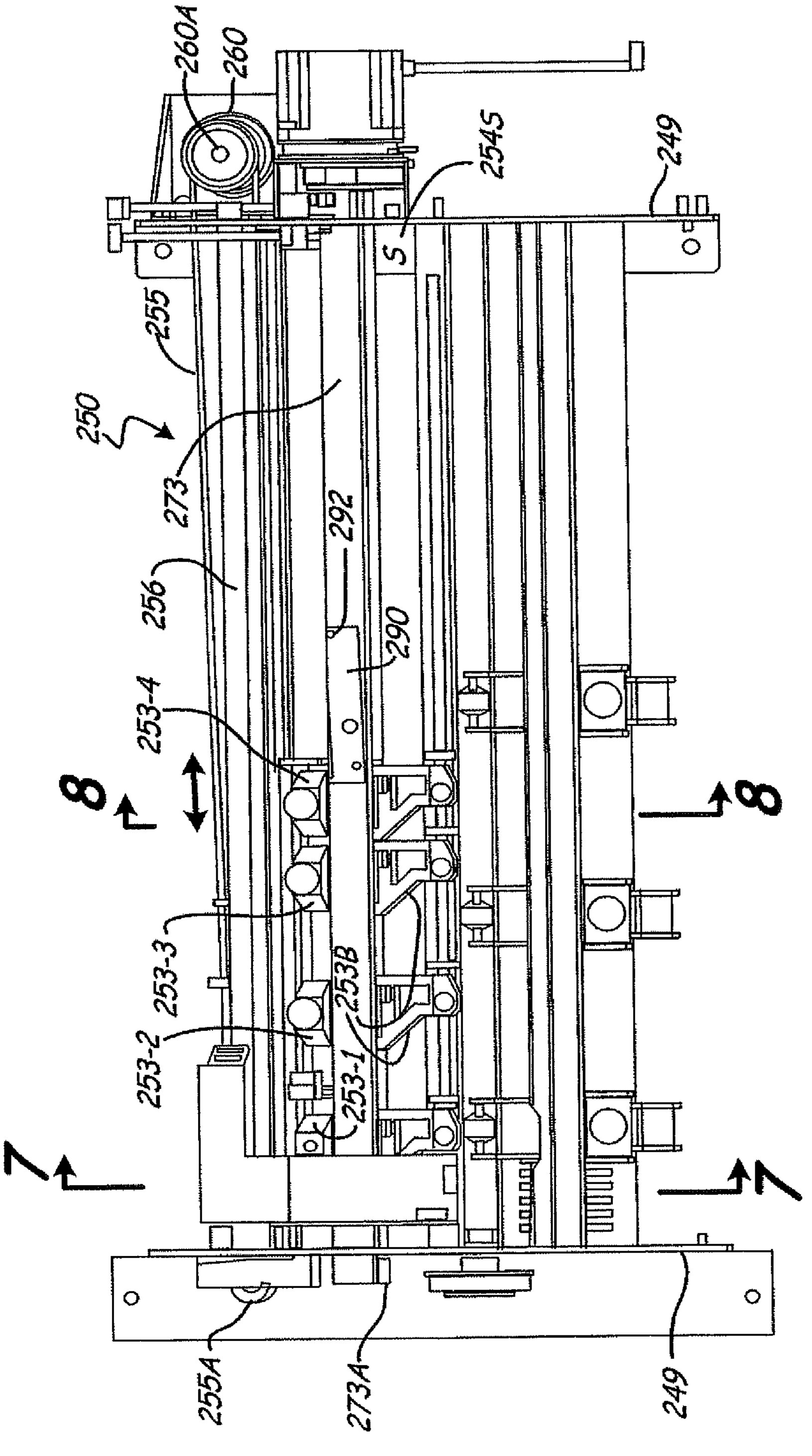
FIG. 5 is a top plan view of an x-y cutter section of the finishing station of FIG. 1.
Figure 7:
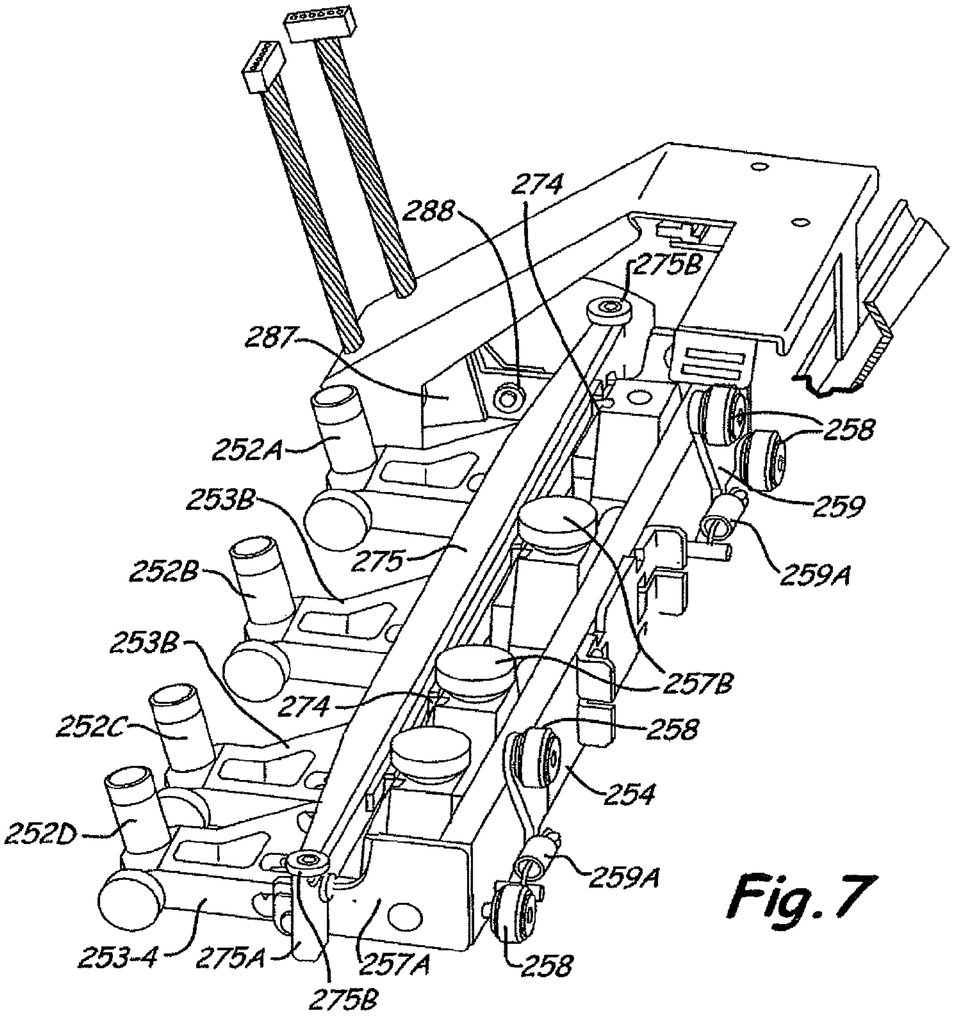
FIG. 7 is a perspective view of the x-y cutter carriage viewed from an opposite direction from FIG. 6, with parts removed for sake of clarity.

As shown in FIG. 7, the multiple cutter station cutter heads 252A, 252B, 252C and 252D are mounted on a common support or carriage 254. Each cutter head carries a cutter knife 247 (FIG. 9) for cutting out the peripheries of labels around the printing on laminated label web 245. As shown in FIG. 5, the cutter station 250 has a cross track 256 supported on independent end plates 249, at opposite ends and the end plates are supported on frame 212. The support or carriage 254 is movably supported on the cross track 256 with two suitable lower rollers 258 (See FIGS. 7, 8 and 9) and two upper rollers 258, one at each end of the carriage 254. The upper rollers are mounted on bell cranks 259 that are spring loaded by springs 259A to hold the carriage 254 on the track 256. As shown in FIG. 1, the cutter station extends laterally of the side plates 222 to provide for lateral movement of the carriage 254 completely across the web on the track 256.

The cross or "x" direction drive for the cutter head carriage 254 is a drive known and used in x-y plotters having single cutter heads, as shown in FIG. 5 A drive belt 255 (See FIGS. 5 and 9) is driven with a pulley from a motor 260, and the belt extends over an end pulley 255A at the opposite end of the carriage from the motor 260. The drive belt 255 is secured to a bracket 255B in a suitable location to the carriage 254. The motor 260 is driven under control to drive the pulley 260A and the carriage 254 is moved along the track 256 and thus all four of the cutter heads 252A-252D are controllably moved in unison, in both directions laterally across the laminated label web 245. The motor 260 is a rapid response, controllable and reversible motor. The cutter heads are selectively moved as a unit with carriage 254 back and forth as needed under computer control from a controller 284, which includes a microprocessor for cutting out the particular configuration of a label around the printing provided on the laminated label web. The drive for the cutter heads along track 256 can be a belt drive such as the single cutter head drive shown in U.S. Pat. No. 5,846,005, which is incorporated by reference. U.S. Pat. No. 5,846,005 also shows a knife and mounting that will work.

The cutter station 250 includes a formed metal anvil 263 (FIGS. 8 and 9) that supports the laminated label web 245 as the web is moved through the cutter station. The laminated label web 245 passes under the individual cutter heads 252A-252D. Each cutter head and the carried knife is mounted identically on a cutter head housing assembly 253-1 through 253-4 that is mounted onto a cutter carriage shaft or support bar 257 that is supported on end plates 257A of the carriage 254 (see FIGS. 7-11). The cutter head housings 253-1 through 253-4 each include a rear cutter head housing section 253A that is slidably mounted for axial movement along the cutter carrier shaft or support bar 257. The rear cutter head housing sections can be releasably secured in lateral positions along the shaft 257 to properly cut out the labels by cutting through the laminating film 228 and the label stock layer 98 but leaving the substrate layer 96 uncut. The cut through the film 228 and label stock 98 is made to define the periphery of the labels, and all the labels in one lateral rank or row (four as shown) are cut out simultaneously.

The correct spacing of the cutter heads for the labels being cut can be calculated in the controller 284 by inputting the width of the web 245, the lateral width, or size of the labels, the number of labels in a rank or lateral row and the spacing at the web edge to the edge of the outer rows of labels. The center to center spacing of the longitudinal rows of labels is determined in the controller 284, which includes a processor, relative to a reference position. As shown, the reference position is established by fixing the distal cutter head housing 253-1 (farthest from the motor 260) in a reference position on cutter carrier shaft 254 with a set screw 257D threaded in a bore of the rear housing section 253A for cutter head housing 253-1.

The cutter head housings 253-2, 253-3 and 253-4 each have manually adjustable thumb screws 257B threaded in a bore in the respective rear cutter head housing sections 253A and the cutter head housings 253-2, 253-3 and 253-4 can be slid along cutter carrier shaft or bar 257 and manually tightened so the cutter head housings are locked in position in the correct location along the support shaft or bar.

The cutter head housings 253-1 through 253-4 each further include a front cutter head housing section 253B that has a first side arm portion 253C and a second side arm 274A that is spaced from the first side arm portion 253C. A portion of the rear cutter head housing section fits between the side arms of the front housing sections (See FIG. 10). The front cutter head housing sections 253B are each mounted to the respective rear cutter head housing sections 253A with a suitable pivot pin 270 (FIG. 9).

The angular position of the front cutter head knife house sections 253B about the pivot pins 270 are controlled by the position of an actuator bar 273 that is pivotally mounted onto the side plates 249 of the cutter station 250. The actuator bar 273 has an arm 273A at each end (See FIG. 5 and FIG. 15), and these arms are pivoted about a common axis. The arm 273A shown at one end of the actuator bar 273 in FIG. 15 has a drive pulley 273B mounted thereon, and it is mounted so that the axis of rotation is along the pivot axis of the arms 273A. The drive pulley 273B is drivably attached to rotate the arms 273A and the actuator bar 273 about the axis of pivotal mounting of the actuator bar. The pulley 273B is driven with a belt 273D and a knife actuation stepper motor 278 mounted on the side plate 249.

The motor 278 is a reversible stepper motor, and it is controlled from the central controller 284 as previously explained, and will move the actuator bar 273 in an arc about the pivotal mounting of the actuator bar.

Figure 9:
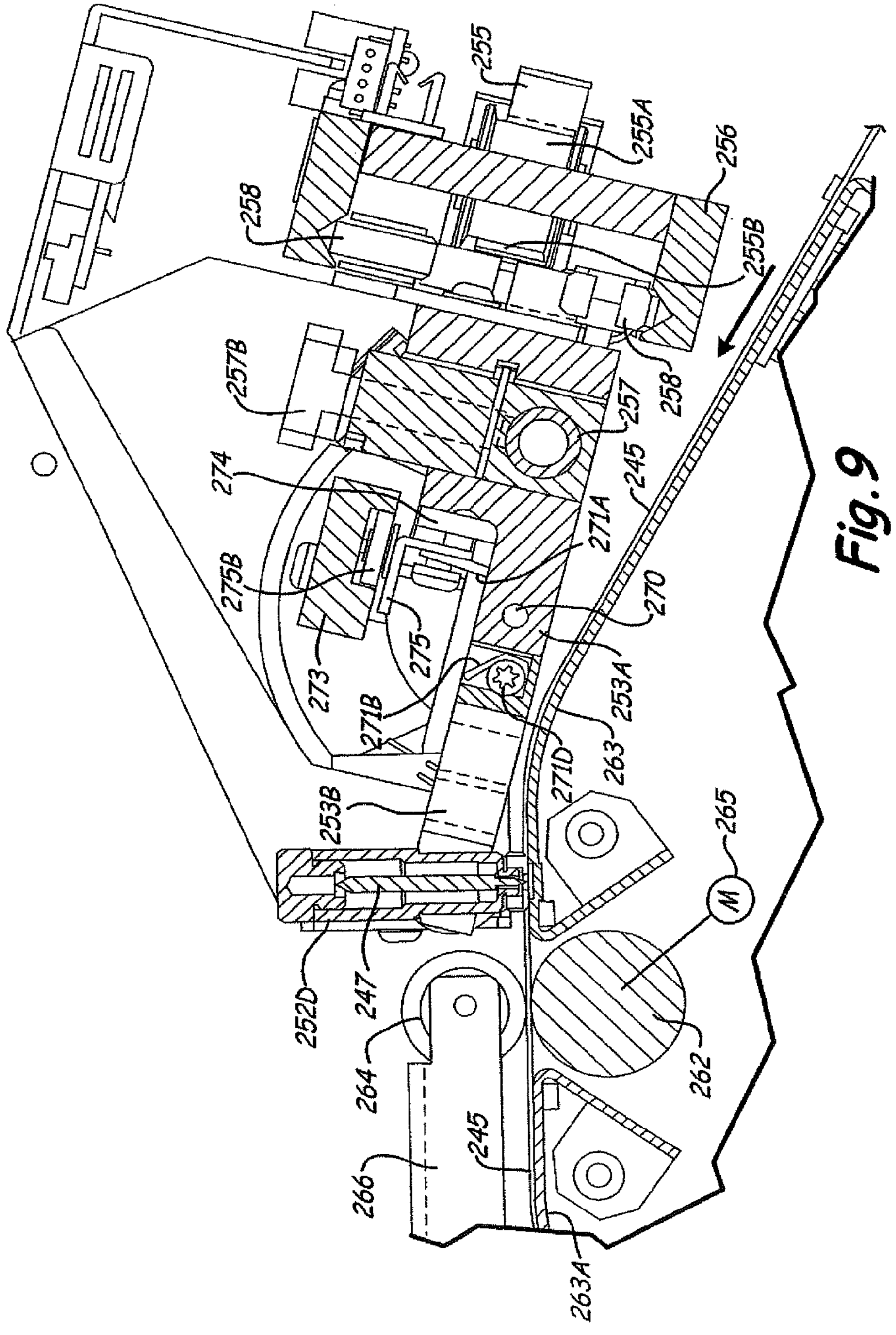
FIG. 9 is a further enlarged fragmentary sectional view taken in opposite direction, but generally along line 8-8 in FIG. 5.

The actuator bar 273 has a channel formed in its underside as shown in FIG. 9 for example and is of size to receive cutter actuator wheels 275B that are mounted on an L-shaped actuator plate 275 that extends across the carriage 254. The actuator plate 275 has arms 275A at the exterior of the end plates 257A and the arms are pivotally mounted to the end plates 257A.

The pivot axis of the actuator plate 275, which is mounted through the arms 275A, coincides with the pivot axis for the actuator bar 273 so that as the actuator bar 273 is pivoted by stepper motor 278, the actuator bar moves the cutter actuator wheels 275B and in turn pivots the actuator plate 275 about its pivot axis. The actuator plate will engage a lift lever or pin 274 on the second arm 274A of each front cutter head knife housing.

Figure 12:
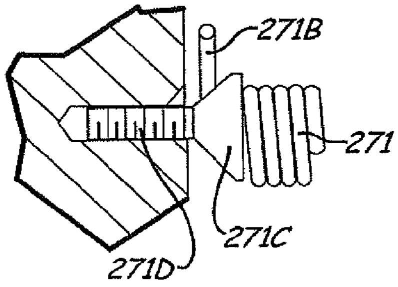
FIG. 12 is a fragmentary side view of a spring adjusting screw used with the cutter heads.

Pivot pins 270 for mounting the front cutter head housing sections to the respective rear cutter head housing sections are held in a block on each of the rear cutter head housing sections that is between the side arms 253C and 274A. A torsion spring 271 mounted on each pin 270 (See FIGS. 9, 10-12) includes a spring actuator leg 271A that engages the spring actuator plate or frame 275. Each torsion spring 271 has a second leg 271B providing a spring force to urge the cutter heads toward the laminated label web, about the pivot pins 270. The legs 271B act against force equalizing adjustment screws 271D (FIG. 12), which have conical surfaces 271C on the head of the screws, so that the amount of force exerted by each torsion spring can be adjusted to be equal to the others by turning the force equalizing adjustment screw 271D. The force from the legs of the torsion spring will tend to pivot the front cutter head housing section so when the knives 247 bear against the laminated label carrying web 245, the amount of force that the torsion springs exert on the knives and the depth of cut of the cutter knives can be equalized by adjusting the screws 271D. The knife actuator plate, which is positioned by movement of the cutter actuator bar 273, as driven by the stepper motor 278, acts against each torsion spring 271 to determine the cut force and cut depth. As the knife actuator plate 275 rotates towards the front cutter head housings 253B, the cut force on the cutting knives is increased. Because the stepper motor 278 is precisely controllable the amount of force on and the position of the front cutter head housing sections and thus, the force with which the knife held in each cutter head engages the laminated label web that is carrying the label and is to be cut can be controlled and changed for different materials or thicknesses. All stepper motors provide position feed back signals to the controller to insure accurate positioning.

If there are variations in the initial force of torsion springs due to manufacturing tolerances the force equalizing adjustment screws 271D can be turned for adjustment.

Figure 15:
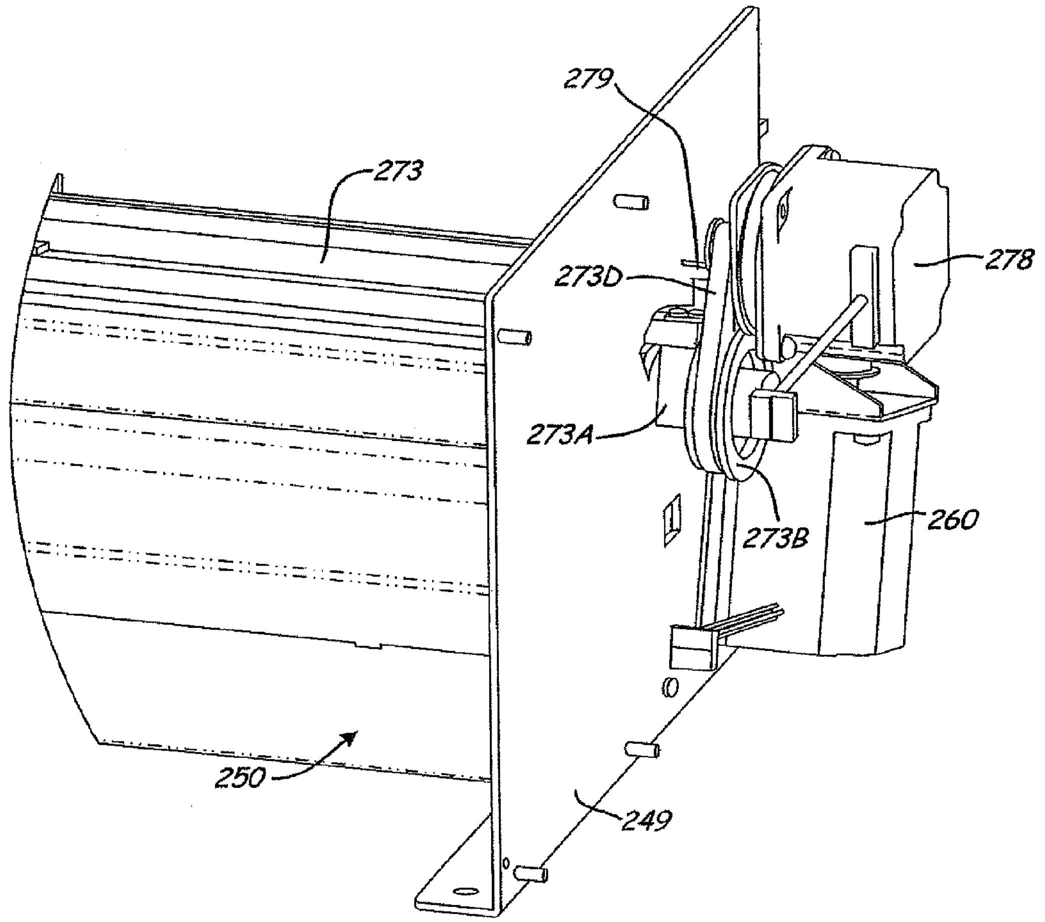
FIG. 15 is a perspective view of a portion of the drive for the knife actuator bar used for controlling knife positions in the cutter section of FIG. 5.

The upright knife lift lever or pin 274 fixed on each arm 274A is to the rear side or back side of the actuator plate 275, as shown in FIG. 7. If the actuator bar 273 is rotated toward the carriage 254 sufficiently, the actuator plate 275 will engage the knife lift levers 274 and lift the cutter heads and knives off the web. If the actuator bar 273 is rotated away from the carriage 254, the knife lift levers 274 will disengage from the actuator plate 275 and the cutter heads and knives 247 carried by the cutter heads are positioned by pivoting the actuator plate so the front cutter head housing sections are bearing on the web and under spring load about the pivot pins 270. The knives 247 can be loaded for the correct depth of cut and lifted when desired during operations or at the end of cutting operations by moving the actuator bar 273 rearwardly to engage the knife lift levers 274 to lift the knives. In FIG. 15, where the stepper motor 278 is illustrated, an actuator bar position sensor arrangement 279 is shown. The sensor 279 has a fixed position slotted sensor component, past which a flag moves on the arms 273A as the actuator bar 273 moved. The sensor is a conventional position sensor.

This sensor 279 will signal when the actuator bar 273 is in its home position, and the stepper motor 278 will be stepped a certain number of steps from the home position so that a known position and cut force can be applied to the cutter heads. The signals from sensor 279 are sensed by the controller 284, and stepper motor 278 will be stepped so the actuator bar 273 is positioned to result in a selected cut force exerted by the torsion springs 271 on the cutter heads. The selected knife position is programmed into the controller so as to cut only through the laminating film and the label layer. The cutting force is selectable by the user.

Figure 8:
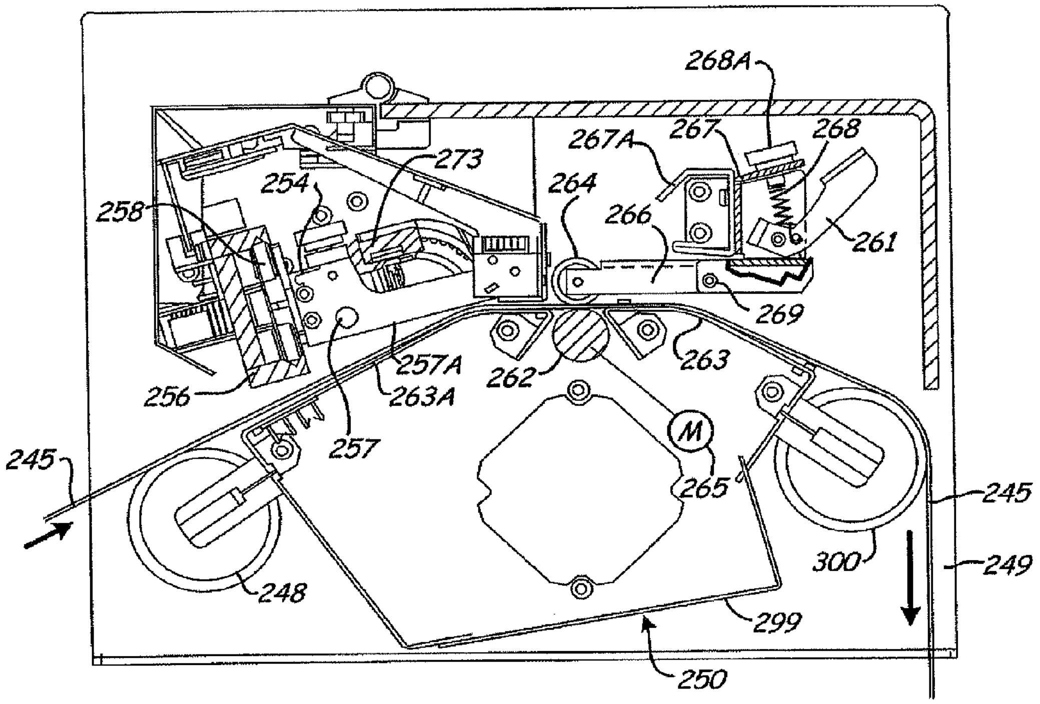
FIG. 8 is a sectional view taken of the cutter section of the second embodiment taken generally along line 8-8 in FIG. 5.

The drive for moving the laminated label web 245 past the cutter heads is on the output side of the cutter heads, as shown in FIGS. 8 and 9. A drive roller 262 is rotatably mounted on the end plates 249 and is driven with a suitable reversible, variable speed drive motor 265 controlled by controller 284. Roller 262 is positioned between one side of the anvil 263, and a formed continuation guide anvil 263A. The anvils 263 and 263A are formed to support the web and provide a space or slot for the drive roller 262.

A desired number of pinch rollers 264 are individually mounted on pivoting arms 266 which are mounted on housing 267 that in turn are mounted on a cross member 267A that will permit adjusting the pinch rollers 264 along the cross member to position as desired in relation to the cutting heads. The arms 266 are mounted to the respective housing at pivots 269. A spring 268 is connected between an adjusting plate, adjustable with a plate adjusting screw 268A on each housing 267, and to an end of an associated pivoting arm 266, to spring load the pinch roller 264 against the drive roller 262. The screw 268A permits adjusting the spring force. A cam lever 261 is provided on the housing 267 and can be pivoted to lift the associated pinch roller 264 from the web 245 when desired. The cam lever 261 permits lifting the associated pinch roller 264 away from the drive roller 262. If a narrow web of labels is being fed, not all of the pinch rollers need to be engaged with the drive roller 262.

As stated, the knives 247 in each of the cutter heads 252A-252D in this embodiment are positioned or controlled as to depth of cut by actuator bar 273 and plate 275 to cut only the top two layers of the laminated label web 245 when the knives 247 are moved to cut the label web. The cutter heads 252A-252D and the knives they carry are moved in the x-direction, or laterally of the web 245 by motor 260, as shown, and the laminated label web is moved back and forth in the y-direction by driving the drive roller 262. The motor 265 for driving the drive roller 262 is a reversible and speed controllable motor operated from the central controller 284.

Figure 18:
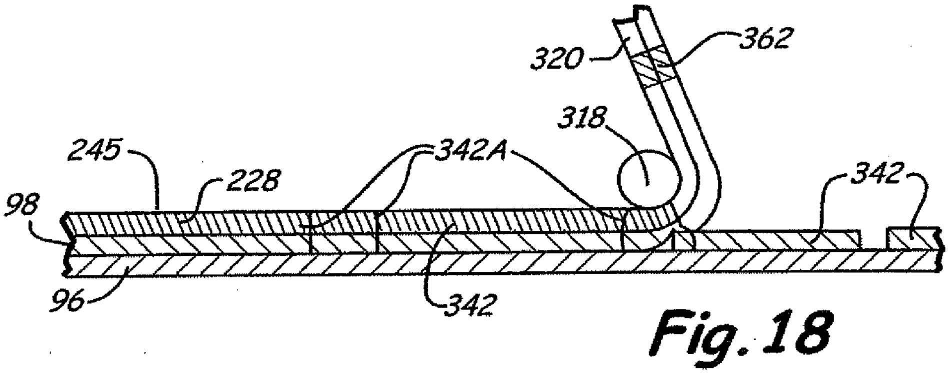
FIG. 18 is a schematic side view illustrating the lifting of waste matrix portions of the laminate and label stock layers after label cutting, which waste matrix is wound onto a waste roll.
Figure 19:
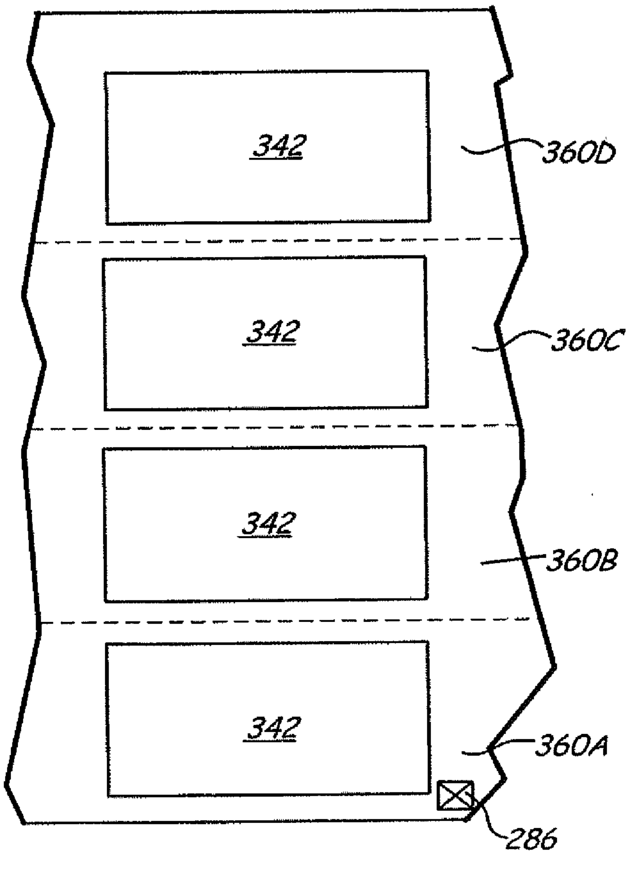
FIG. 19 is a fragmentary plan view of a typical label strip having a plurality of labels printed across the width of the strip after the labels have passed through the x-y cutter section.
Figure 20:
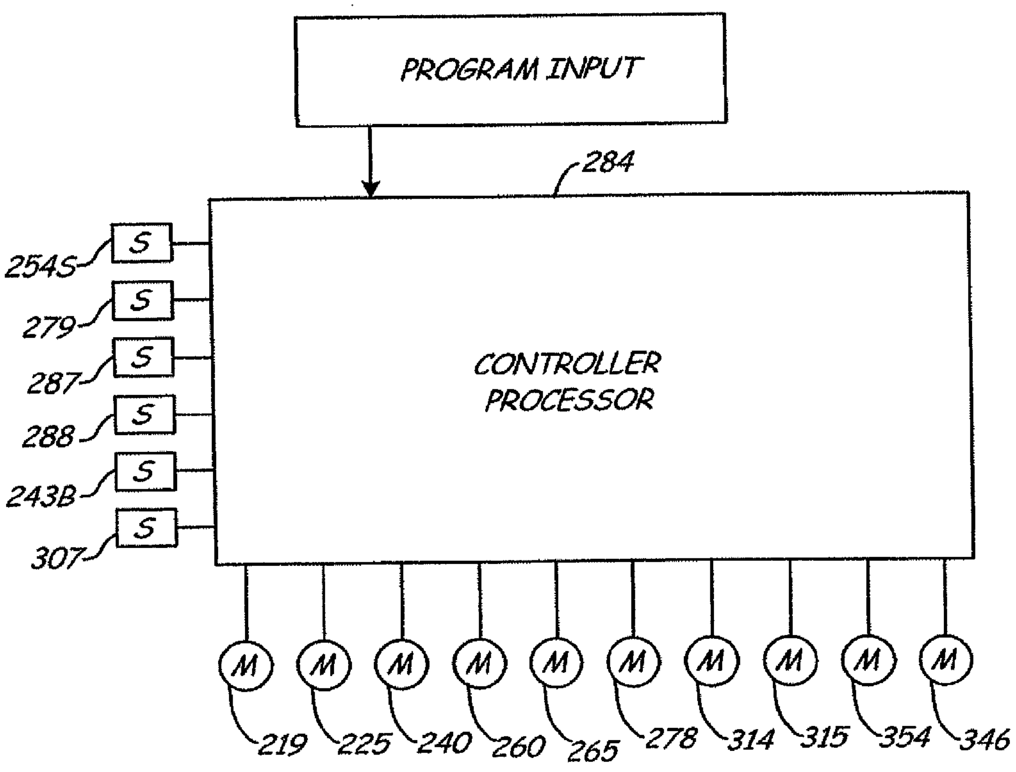
FIG. 20 is a block diagram representation of a controller used for controlling various functions of the finishing station in response to inputs and feedback signals.

By controlling the motor 260, for the x-direction movement of the multiple cutter heads, and motor 265 for moving the web 245, using a suitable programmed controller such as that shown at 284 in FIGS. 1 and 20. The movement of the laminated label web and the movement of the cutter heads by the motor 260 can define a peripheral shape around each one of the printed images on the laminated label web 245 and will be cut through laminate film 228, and the label stock 98 on the laminated label web 245 to separate out the labels and leave the substrate layer 96 uncut. Details showing the web are illustrated in FIGS. 17, 18 and 19.

Figure 10:
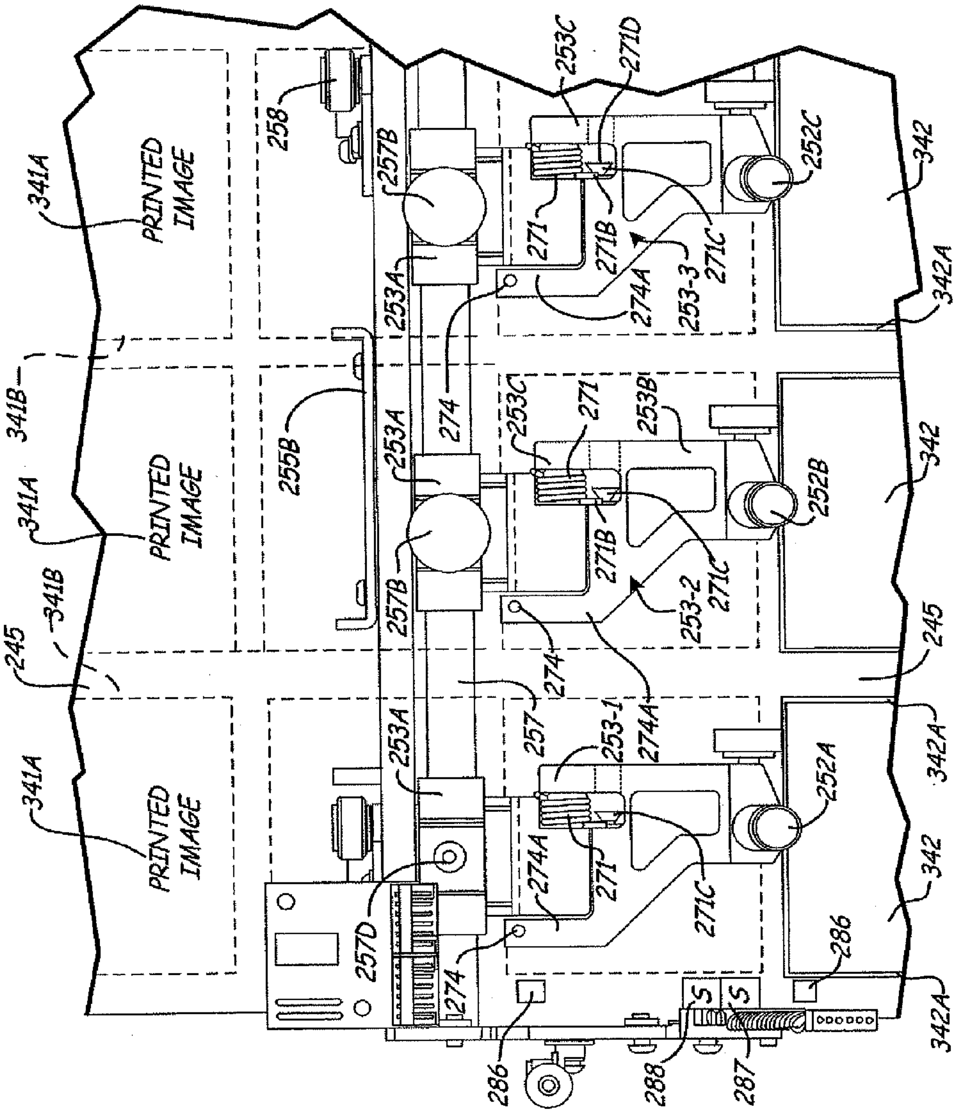
FIG. 10 is a top plan view of three of the cutter heads used with the finishing station of FIG. 1 of the present disclosure.
Figure 11:
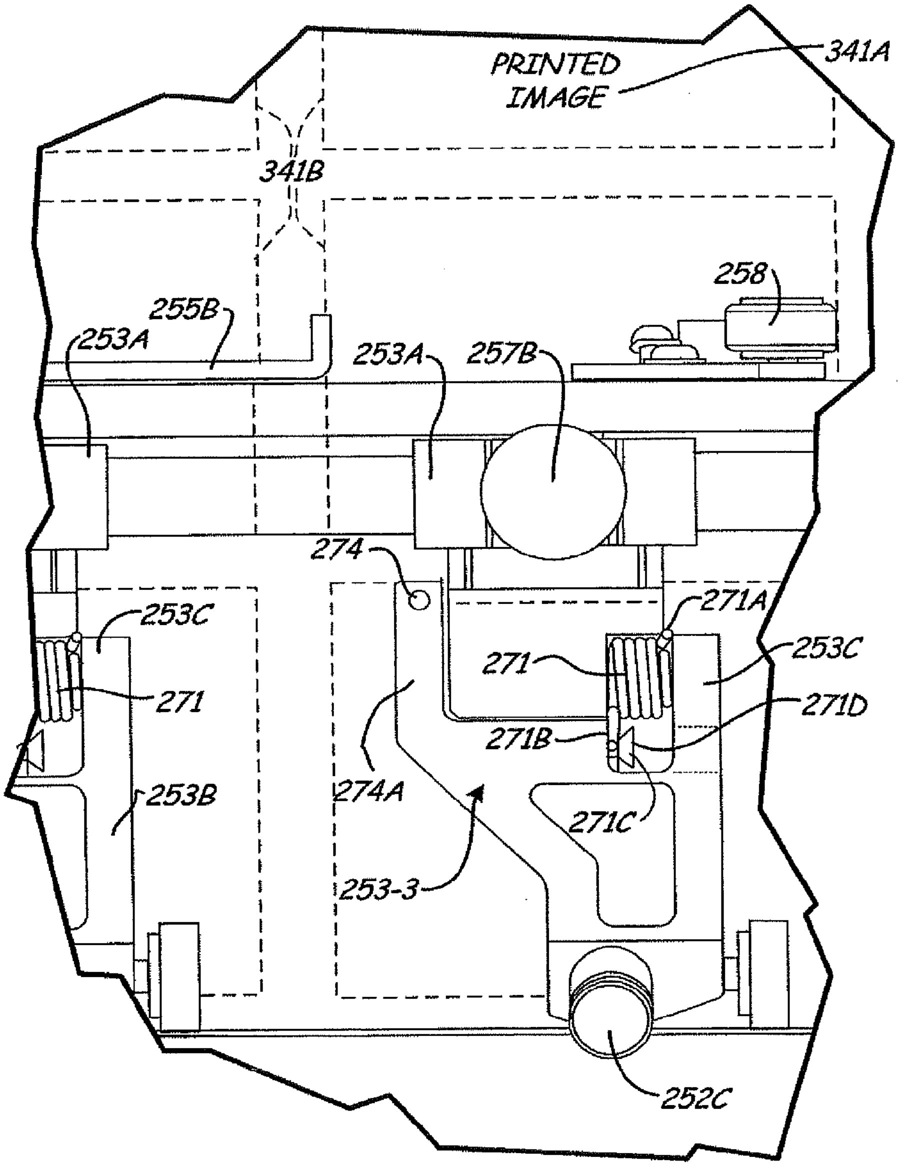
FIG. 11 is an enlarged top plan view of one cutter head illustrating details of mounting cutter head housing sections.

The starting position of the cutting heads 252A-252D is controlled by signals from sensors that sense the registration marks on the web such as that shown at 286 in FIG. 10, and a pair of sensors are used to locate the carriage 254 and cutter heads in a known position in the x direction and to locate the web at the start position for cutting a cross row or rank of labels. In FIGS. 7 and 10, a first sensor 287 senses a registration mark such as that shown at 286 (FIG. 10) for the x-direction, which positions the cutter heads laterally and a second sensor schematically shown at 288 senses the position of registration mark 286 in the y-direction for web movement. A registration mark can be printed on the label layer when the printed images are printed. One or more registration mark for each rank or cross now of printed images can be provided. In addition, a sensor 254S is used for indicating a home position for the cutter head carriage 254.

Once the registration mark has been sensed, the motors 260 and 265 for driving the carriage 254 and the cutter heads 252A-252D and for driving the laminated label web 245 adjust the position of the cutter heads in the x-direction and will drive roller 262 to adjust the position of web 245 in the y-direction to a start position. The cutter head drive motor and web drive motor then will follow the desired pre-programmed path to cut out the individual labels around printed images. Again, the cutting of the multiple labels occurs simultaneously. The cut labels are shown schematically at 342 in FIGS. 10 and 19.

The controller 284 controls the lateral positions of the cutter head housings and is also programmable to permit precisely calculating the correct spacing of the cutter head housings relative to each other.

As was explained, the distal cutter head housing 253-1 is fixed at a reference position at the factory relative to a cutter positioning lever 290 that has a locating tab 291, and which his pivoted on a pin 292 on actuator bar 273. The tab 291 is at a known lateral position relative to the track supporting the carriage and to frame 212 and relative to the reference position when the carriage is in a start position.

If there are four columns of labels, the other three cutter head housings will be spaced from the cutter head housing 253-1 an amount dependent on the size and spacing of the labels. The spacing distance between the adjacent cutter heads is calculated by the processor in the controller 284 after the number of label rows and the overall width or span of the web and edge spacing is programmed into the controller. The factory setting for the cutter head at the "one" or first position on the support bar or shaft insures that the housing 253-1 will be at its reference position related to the position of index mark 286 as sensed by sensor 287 when the carriage is moved to a known "start" position.

Initially the index mark 286 and sensor 287 are used to position the cutter head carriage so the knife carried by the reference cutter head housing 253-1 is properly positioned to cut the edges of the labels in the row of labels along the side of the web 245 remote from motor 260.

The controller will operate motor 260 to three additional lateral positions (when four cutter heads are used) and the spacing between the positions for the three additional cutter head housings will be calculated in the controller processor from the inputs by the operator.

The controller will be instructed by the operator to operate motor 260 to move the carriage 254 to "position two" which sets the carriage at a known position relative to the track 256 or frame and thus relative to locating tab 291 of lever 290. The tab 291 is a first locating element at a precise location relative to the track 256 for positioning a second locating element comprising a machined notch 293 on the cutter head housing 253-2 for locating the housing at position two.

Figure 13:
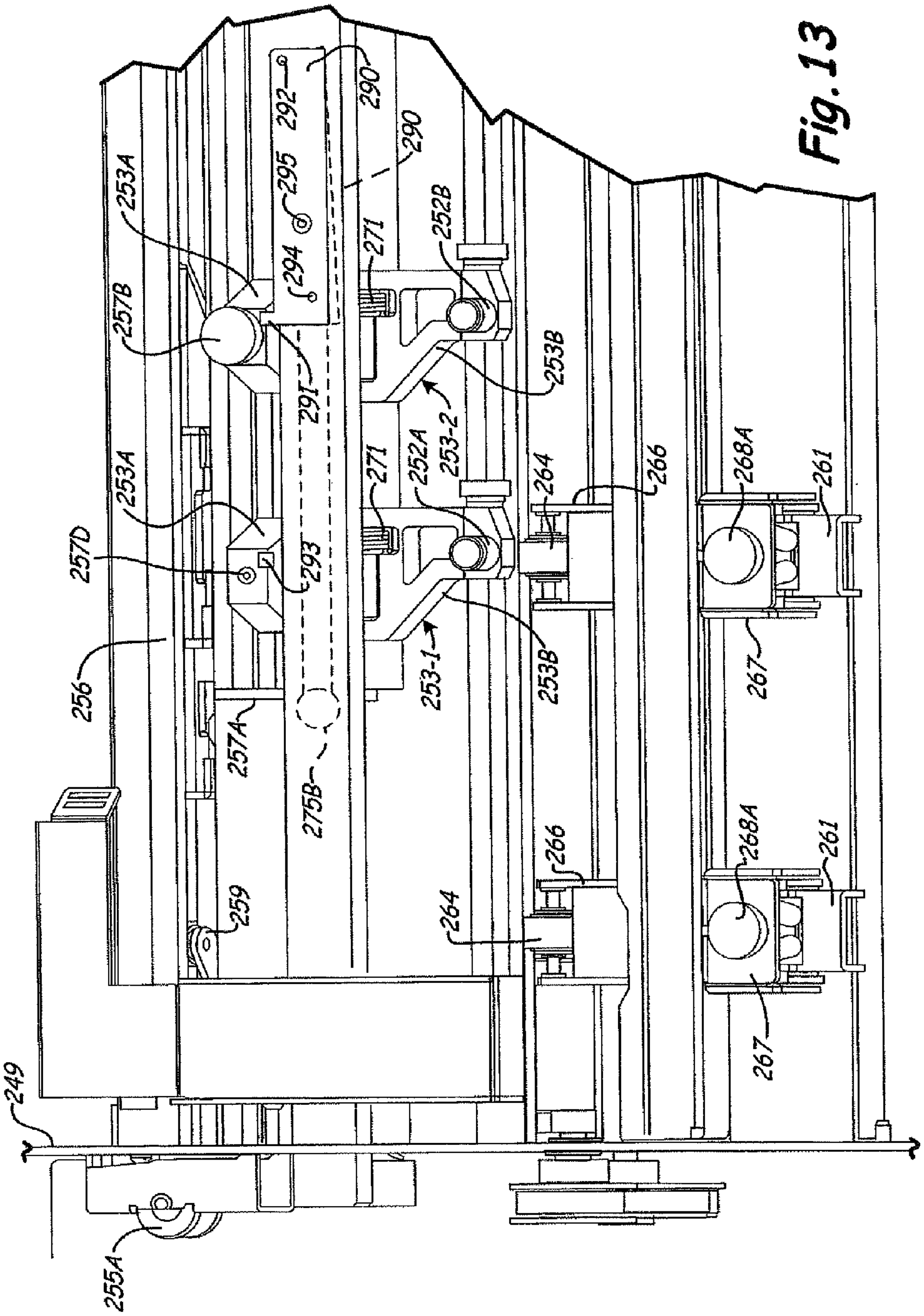
FIG. 13 is a fragmentary top view of a cutter section illustrating apparatus used in a method of setting the spacings of cutter heads.

The thumb screw for cutter head housing 253-2 is loosened and the housing is slid along shaft 257 until the lever 290 can be pivoted about a mounting pin 292 that holds the lever on actuator bar 273 to fit the tab 291 into notch 293 on housing 253-2 (See FIG. 13). It is then known that the second cutter head housing 253-2 is precisely located relative to the fixed cutter head housing 253-1 and the thumb screw 257B for housing 253-2 is tightened down, and the lever 290 is pivoted to the dotted line portion shown in FIG. 13 to retract tab 291 from the notch 293. The lever 290 has a spring detent 294 to hold it retracted, so the tab 291 is disengaged from the notch 293. A screw 295 holds the lever 290 down on the actuator bar. The controller then moves the carriage 254 to position three and cutter head housing 253-3 is loosened and moved along shaft or bar 257 so the tab 291 can be inserted into the notch 293 on that housing. The locating elements are thus engaged. The thumb screw 257A for housing 253-3 is tightened and the housing is properly located at position three. This procedure is repeated for housing 253-4 as well, to place it at position four. The user is enabled to get very accurate spacing between the cutting blades very quickly. The cuts made then circumscribe the locations of the printed images for the labels, in accordance with a program provided to the controller 284. The method for positioning the cutter heads thus includes determining the desired spacing between a plurality of adjacent positions of the carriage along the track 256 (positions one to four as disclosed). The carriage is moved sequentially to each position and with the carriage at each position a separate cutter housing and thus a separate cutter head is moved in sequence to the known location relative to the track or frame by engaging the locating elements (the tab and the notch) and then that cutter housing is locked to the shaft or bar 257. These steps are repeated until all of the cutter heads are secured in proper position.

FIG. 10 includes a fragmentary showing of web 245 when approaching, and in, the cutter station 250. The printed images are represented at 341A and prior to cutting the label out the outlines desired are shown by dotted lines 341. The labels after cutting the perimeters are shown at 342 and the cut lines are shown as solid lines 342A.

Figure 6:
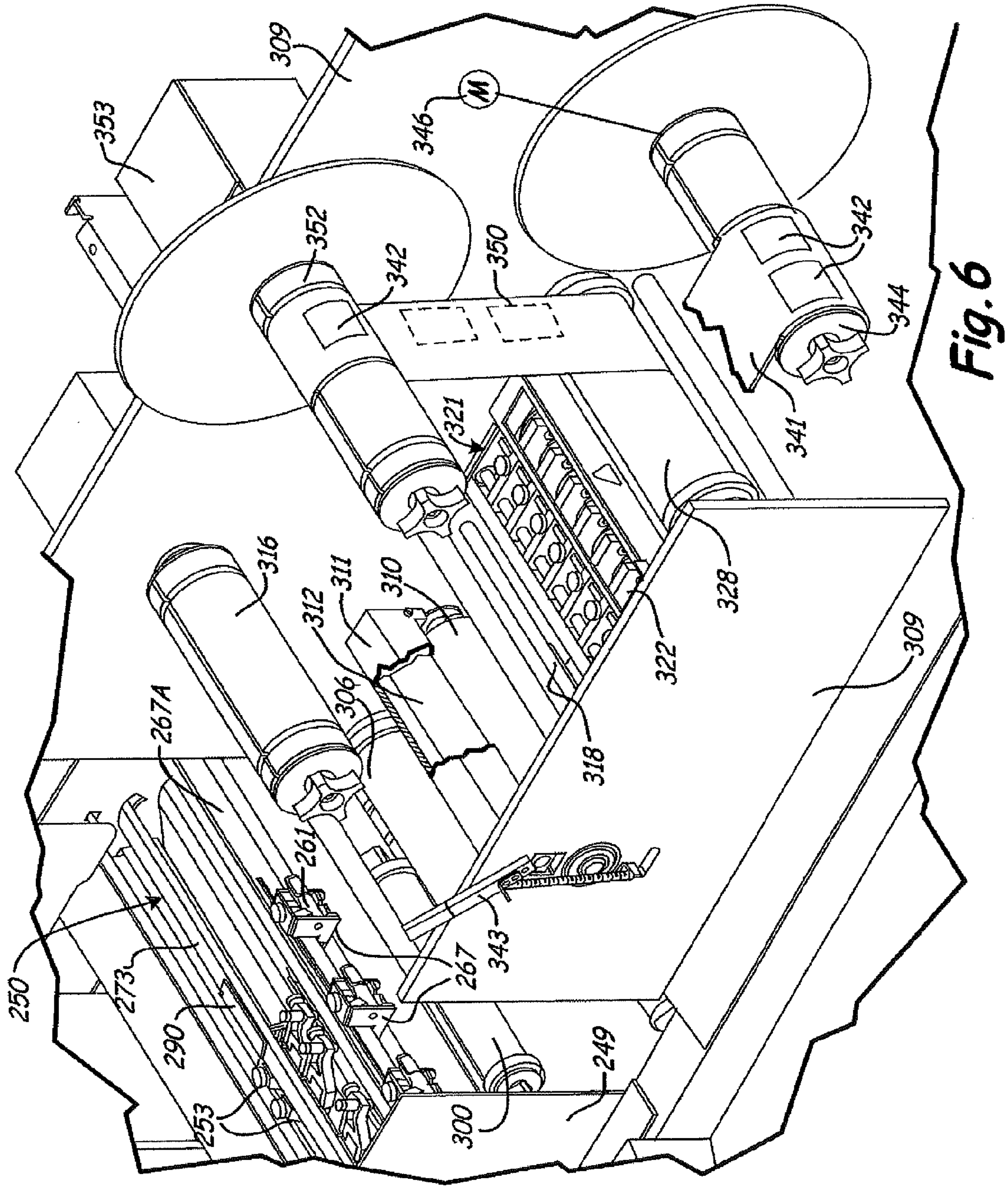
FIG. 6 is an enlarged perspective view of the x-y cutter section and longitudinal web slitting portion of the finishing station of FIG. 1 of the present disclosure.

The laminated label web 245 is advanced toward take up rolls after cutting the label perimeters in the cutting station 250. Each label has its perimeter defined by the cut lines, such as that shown in FIG. 10 at 342A and also in FIGS. 17 and 19, through the laminate film 228 and the label stock 98. The laminated label web 245 is then passed over an idler roller 300 which is rotatably mounted on suitable brackets and attached to the anvil 263 in the cutting station, (See FIG. 8) and the laminated label web 245 is passed down around a second dancer roller 302 (FIGS. 2 and 14) that is rotatably mounted on arms 303 that are pivotally mounted on brackets 304. The dancer roller arms 303 are spring loaded so that the roller 302 will tend to move downwardly under spring force using a suitable spring 305. The spring 305 is mounted onto levers 303A on the arms 303 supporting the dancer roller, as shown. A sensor arrangement 307 identical to the showing in FIG. 3 indicates the position of lever 303A for providing signals indicating the position of the dancer roller 302 throughout its travel up and down. The laminated label web 245 is then passed over idler rollers 306 and 308, that are rotatably mounted on side plates 309 mounted on the frame 212. The web is then fed into a second label web drive including a drive roller 310 and a pressure roller 312 that is used for urging the web against the drive roller to permit driving the laminated label web. A cross member 311 overlies the pressure roller 312 as shown in FIG. 6. The second web drive roller 310 is between the dancer roller 302 and take up or storage rollers.

Figure 14:
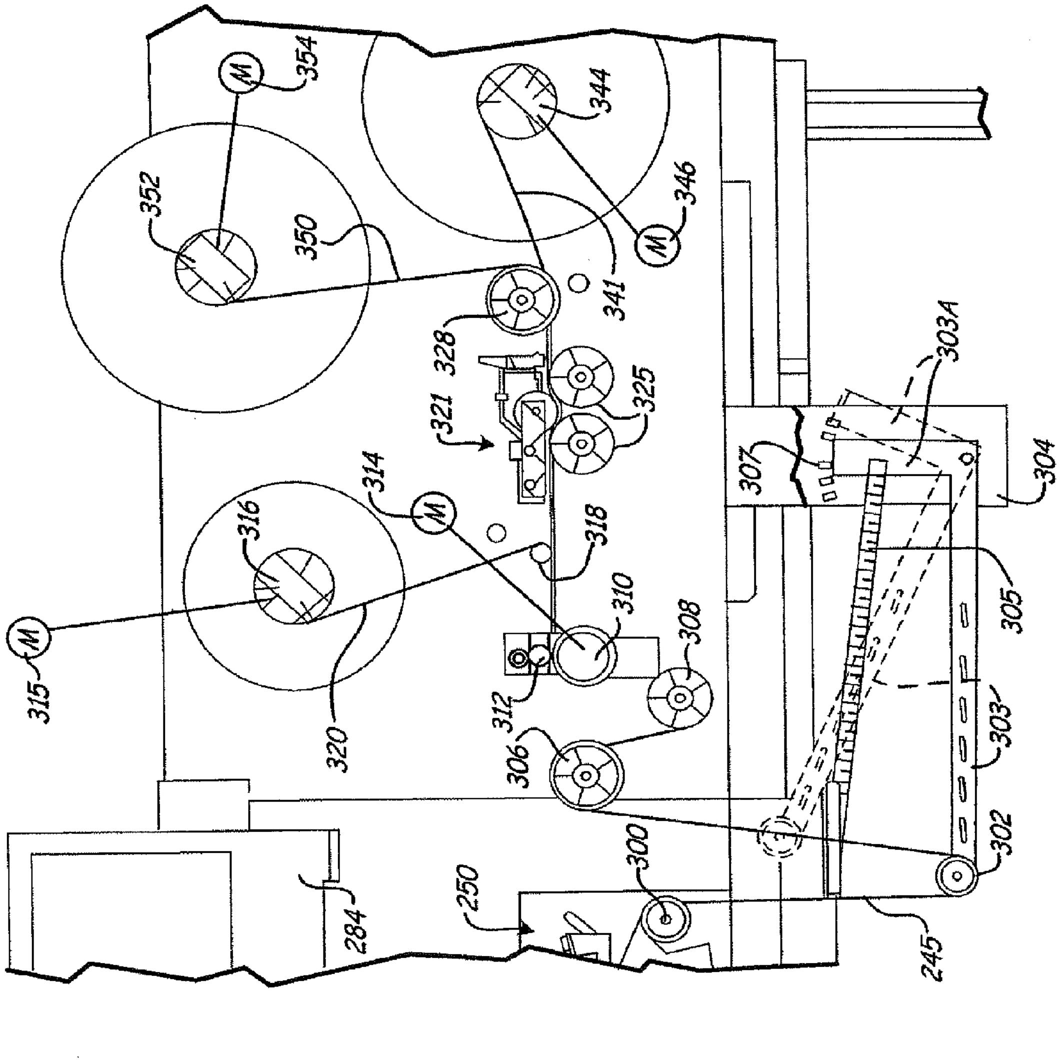
FIG. 14 is a fragmentary enlarged side view of a portion of FIG. 2 on an output side of a label cutter section.

A drive motor 314 is used for driving the drive roller 310, and is controlled from the central controller 284 to ensure the web is kept moving. The waste matrix 320 formed by portions of the laminate layer and the label stock layer which were surrounding the labels that are cut out from the laminated label web is then removed by lifting it off the release layer or substrate and threading it onto a waste material mandrel 316 (FIGS. 2, 14 and 18) that is supported on a side plate 309 with a support 317 and driven by a suitable motor 315. The sharp angle or sharp change of direction of the waste matrix 320, at a roller 318, that acts as a separation roller, makes separation of the waste from the labels and substrate easy. The roller 318 is rotatably mounted between the side plates 309, as shown in FIG. 6. The waste matrix is wrapped on the mandrel 316. The waste matrix 320 is lifted off the release layer 96 as shown in FIGS. 2, 14 and 18. The cuts 342A through the laminate film and label stock surround each printed image to define or form a label. The separated labels remain on the release layer or substrate 96. Removal of the waste matrix 320 leaves the individual labels 341 on the release layer or substrate. In FIG. 18 the material between the cut out labels from the laminating film and label layer that is left on the waste matrix is shown at 362.

A slitting station is indicated at 321. The slitting station 321 is positioned to longitudinally slit the release layer of the web into two or more separate columns of labels carried on the release layer to provide a plurality of individual lengths or strips, each having one or more columns of finished labels. In FIG. 19, four separate strips of labels are shown at 360A-360D and labels 342 are also shown schematically. In the slitting station 321, there are a plurality of circular knives 323, much like razor blades, each mounted on a separate arm 322. The arms 322 are between side wall housings 324 that are pivotally supported on a cross rod 326, that is supported on side plates 309. Knives 323 are not rotating, but have very sharp edges and in a working position shown in solid lines in FIG. 16, the knives 323 will pass through and slit the substrate or release layer indicated at 323A. The circular knives, much like razor blades, are divided into identifiable segments so that they can be rotated and a different sharp segment can be used when one of the cutting segments becomes dull. In this form, a pair of support rollers 325 are rotatably mounted on the side plates 309, and the space between the rollers 325 is such that the circular knives 323 can protrude through the substrate 323A, since the substrate will be adequately supported so that it does not buckle under the knives but rather is slit as the substrate is moved.

Figure 16:
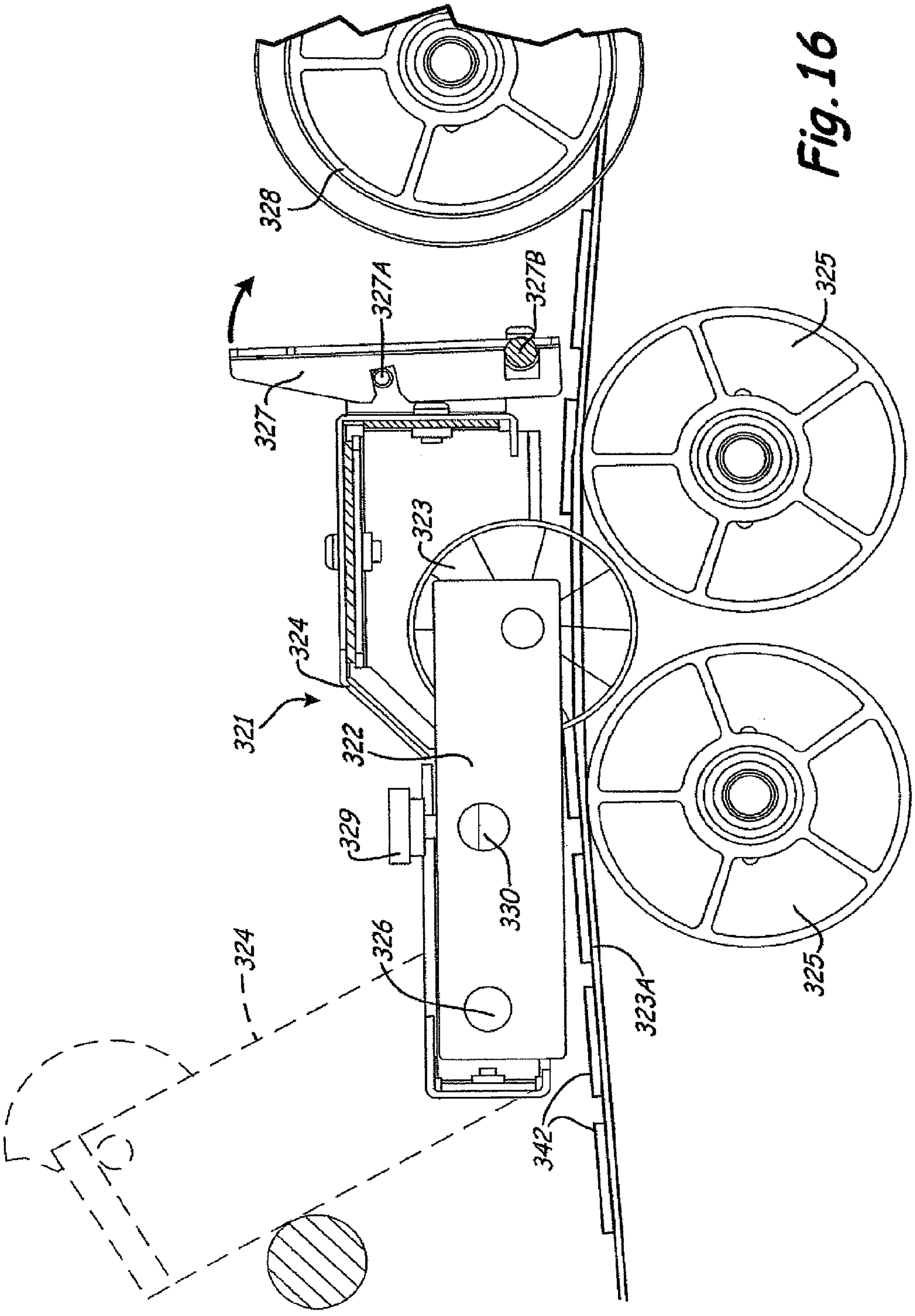
FIG. 16 is an enlarged sectional view of a slitter used for slitting the printed labels and rollers for carrying the web.

The housing 324 for the slitting knives can be raised as a unit to the dotted line position shown in FIG. 16. A spring loaded latch 327 is utilized for latching the housing associated with the latch into its working position by snapping it over a pin 327A on the end of the housing. The frame 324 and circular knives can be released and moved to a dotted line non-slitting position when desired. The latch 327 is mounted on a pivot pin 327B. The lateral position of each arm 322 relative to the housing can be adjusted by loosening an adjustment screw 329 that is threaded into the arm and by sliding the arm along the pivot shaft and locking shaft 330 to move the arm laterally relative to the housing frame. This way the slitting knives can be adjusted to whatever label strip widths are desired. This example requires only three circular slitting blades 323. Up to seven circular slitting blades may be used to slit the web 245 into eight different portions, if desired.

The slit or separated strip portions of the substrate 323A with the labels attached are then passed by an idler roller 328 that is rotatably mounted on the side plates 309 (FIG. 6), and then if desired one of the strips 341 of labels, for example, having two labels 342 side by side thereon as is passed onto a take up or storage mandrel 344 that is mounted with a support 345 to a side plate 309 and is driven by a suitable stepper motor 346, for the take up or storage of the substrate containing cut out labels 342. A second strip such as that shown at 350 is taken from the idler roller 328 and passed over a second take up or storage mandrel 352 that is supported on a side plate 309 with a support 353 and is driven with a suitable stepper motor 354, to wind this strip having the cut out labels 342 thereon, as shown in FIG. 6, into a separate roll that can be used for dispensing labels or other purposes.

The pinch or pressure roller 312 for driving the web after it has passed through the cutting station can be spring loaded and cams may be actuated with a lever 343, which will lift the roller 312 the drive roller 310 as shown in FIG. 19. This can be a simple cam arrangement, to load and operate the pressure roller or nip roller and remove it from its position driving the web when desired.

In operation, the media web 224 is unwound from the web supply roller or source while the motor 219 provides a small amount of back tension on the media web under control from the controller 284. The media web may be provided directly from a label printer as well, as was stated. The laminating film roll motor 225 is also controlled to provide a small amount of back tension on the laminating film 228 as the media web 224 and film 228 are driven by rollers in the laminating station 238. The motor 240 provides enough drive power to roller 238 to overcome the back tension on the media web and laminate film.

The drive roller at the cutter station 250 is also controlled by the controller 284, and as was stated, the dancer roller 242 can move up and down depending on the amount of slack in laminated label web 245. The dancer rollers move to provide slack to accommodate back and forth movement of the web as the labels are cut out. The drive roller 262 and its motor 265 regulate the overall speed of feeding through the cutting station 250, and the speed of web movement can be adjusted depending on the size and complexity of the peripheral shape of the labels. The speeds of the drive roller 239 and drive roller 310, which is the roller on the output side of the cutter station driving the web after it has passed over the second dancer roller 302, and before the web is wound onto take up rollers, control the web at a speed to approximately match the lineal speed of the web 245 as it passed through the x-y cutter station 250. In other words, the dancer rollers can move up and down as the slack in the web may change as the web is moved back and forth by drive roller 262 as the labels are cut. The motors that drive the web through the lamination station and that drive the web on the output side of the cutter station are controlled by controller 284 in part from signals received from the dancer rollers sensors 243B, and 307 that indicate slack of the web at each of those dancer rollers. The dancer rollers can be configured differently is desired, for example the dancer rollers can be slideably mounted in slotted supports and slide along the supports as the slack in the web changes.

The individual knife housings 253 for the cutter heads are adjusted along their support shaft 257 to space them when initially starting a run, as explained, so that they will cut around the printed material on the label stock. The knife housings are adjusted so that the desired number of labels that are laterally across the web can be cut at once, and as shown with four cutting knives, four rows of labels can be cut to shape. There can be finished label take up rollers for each of the individual strips of labels shown in FIG. 19.

One advantage of the present system is greatly increased speed of separating out the individual labels using the multiple head cutter station, and this also greatly increases production rates for smaller runs when costs do not justify using more expensive rotary dies. The cutter heads are easily programmed to cut the periphery around the printed image or material.

While the embodiments shown and described disclose a lateral drive for the cutter heads and a web longitudinal drive, the cutter head section can be mounted to be controllably moved in both x and y directions to cut labels around printed images while the web is held stationary. The multiple cutter heads will cut out a plurality of labels at once, as described, and then the web can be moved to place another set of images in alignment with the cutter heads and another set of labels can be cut by moving the cutter heads relative to the web in both the x and y directions under controlled and programmed drives.

Although the present invention has been described with reference to preferred embodiments, workers skilled in the art will recognize that changes may be made in form and detail without departing from the spirit and scope of the invention.

What is claimed is:

1. A method of positioning a plurality of cutter heads along a support bar of a movable carriage in a label finishing apparatus, the carriage being movable to a plurality of spaced positions along a track, and the cutter heads being releasably movable and fixable on the support bar, comprising:

determining the desired spacing between a plurality of adjacent positions of the carriage along the track for simultaneously cutting a selected number of label perimeters in a rank from a web carrying printed images;

moving the carriage sequentially to each of the plurality of positions; and fixing a separate cutter head to the support bar at a known location relative to the track with the carriage in each of the plurality of positions such that the cutter heads are fixable on the support bar for simultaneous movement as a unit in one of the X and Y directions.

2. The method of claim 1 wherein the determining of the desired spacing between adjacent cutter heads comprises determining the number of printed labels to be formed on a lateral dimension of the web, and calculating the spacing between central axes of labels arranged across the web.

3. The method of claim 1 wherein fixing a separate cutter head at a known location relative to the track comprises first and second releasably interfitting elements, a first element being mounted at the known location relative to the track and the second element being on each cutter head, moving a separate cutter head along the support bar, interfitting the elements at each of the plurality of positions of the carriage and fixing the respective cutter head to the support bar with the elements interfitted.

4. The method of claim 3 wherein one of the interfitting elements comprises a movable tab and the other comprises a groove to receive the tab.

5. A method of positioning a plurality of cutter heads in a label finishing apparatus relative to a support carriage on a support bar carrying the cutter heads, the carriage being movable to a plurality of positions along a track carrying the support carriage, and the cutter heads being releasably movable on the support bar, comprising:

determining the desired spacing between adjacent cutter heads on the support bar;

providing a reference first position for a first of the cutter heads adjacent one end of the support;

moving the carriage to a second position;

interfitting interlocking members of a second cutter head and a movable locator held at a fixed position relative to the carriage support;

fixing the position of the second cutter head on the support bar with the interlocking members of the second cutter head and the locator interfitted;

releasing the interlocking members and moving the carriage to a third position;

moving a third cutter head along the support bar and interfitting the interlocking members of the third cutter head and the movable locator;

fixing the position of the third cutter head on the support bar with the interlocking members interfitted; and repeating the releasing, moving, interfitting positioning and fixing for a desired number of subsequent cutter heads such that the plurality of cutter heads are fixed to the support bar for simultaneous movement as a unit in one of the X and Y directions so as to simultaneously cut a plurality of label perimeters in a rank.

* * * * *